(No Model.)
A. STARK.
HARVESTER REEL MECHANISM.
No. 495,846. Patented Apr. 18, 1893.
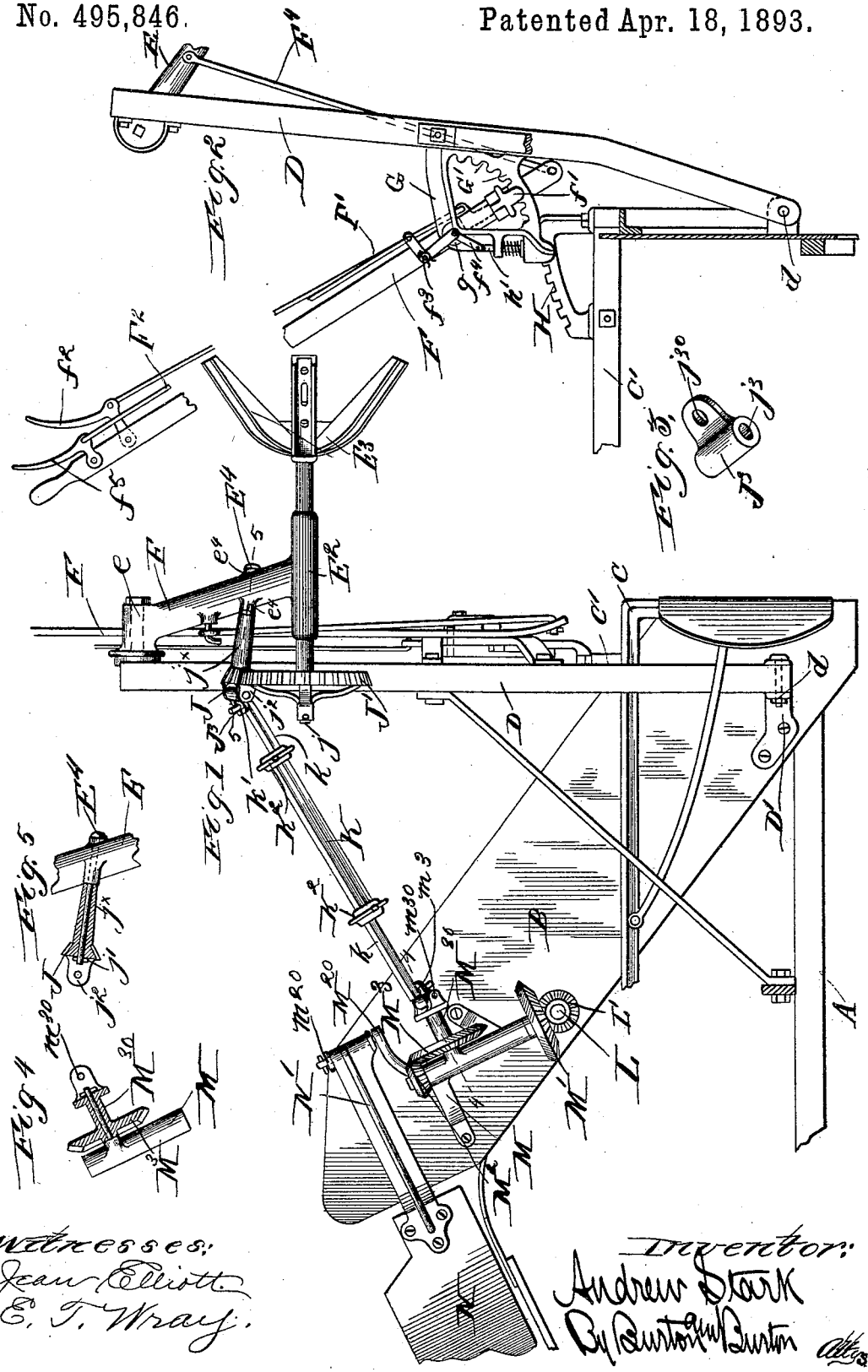
Witnesses:
Jean Elliott
E. T. Wray
Inventor:
Andrew Stark
By Burton and Burton
Attys

UNITED STATES PATENT OFFICE.

ANDREW STARK, OF CHICAGO, ILLINOIS.

HARVESTER-REEL MECHANISM.

SPECIFICATION forming part of Letters Patent No. 495,846, dated April 18, 1893.

Application filed October 27, 1892. Serial No. 450,111. (No model.)

*To all whom it may concern:*

Be it known that I, ANDREW STARK, a citizen of the United States, residing at Chicago, county of Cook, and State of Illinois, have invented certain new and useful Improvements in Harvester-Reel Mechanism, which are fully set forth in the following specification, reference being had to the accompanying drawings, forming a part thereof.

In the drawings,—Figure 1 is a front elevation of my improved reel mechanism, the reel arms and bats being removed from the spider, the portion of the harvester which supports the frame being shown in front elevation together with the binding mechanism which is operated from the same shaft which gives power to the reel. Fig. 2 is a stubble side elevation of the reel mechanism. Fig. 3 is a perspective of one of the two similar universal joint connections of the reel driving shaft. Fig. 4 is a detail section at the line 4—4 on Fig. 1. Fig. 5 is a similar section at the line 5—5 on Fig. 1.

A is the front sill of the harvester.

B is the forward side of the elevator.

C is a bar of the harvester frame which supports the seat plank C', and extends horizontally parallel with the front sill in front of the elevator. These are familiar features of harvester construction, and are identified merely to locate the other mechanism which pertains to this invention.

The reel mechanism which constitutes this invention is applied to and includes a reel which has two adjustments, one fore and aft and the other up and down, and for the purpose of such adjustments has for its support two parts pivoted together at one end of each, the other end of one of the parts being pivoted on the main frame and the other end of the other having the bearing for the reel shaft. The part which is pivoted on the main frame in the reel herein shown is the reel post D, and the part pivoted to the reel post and having the reel shaft at its free end, is the reel bearing frame E. The fore-and-aft adjustment is effected by rocking the reel post over its foot pivot at $d$ on the main frame. As illustrated, the forward side of the elevator affords support for the bracket D' having the pivot $d$.

The vertical adjustment is effected by rocking the reel bearing frame E up and down about its pivotal connection at $e$ to the upper end of the reel post. One feature of the invention relates to the means for adjusting the reel about these pivotal supports and locking it. Both these adjustments are accomplished by a lever arm or handle F, which is so connected to the reel post that it may swing about either of two centers, one center being the foot pivot $d$ of the reel post in the bracket D', and the other being a pivotal connection of the lever arm F to the reel post. Such pivotal connection of the lever arm F to the reel post is obtained upon the bracket G which is bolted fast to the reel post and comprises an interiorly notched segment G' in the arc of a circle about the pivot $g$, at which said lever F is secured. The lever F is provided with a locking dog $f'$, which is adapted to engage the notched segment G', and with devices of familiar character to guide said dog on the lever, and a link F' from the dog to a thumb lever $f^2$, pivoted on the lever F near the handle end. While the dog $f'$ is engaged with the notched segment G at any position, the lever F is fixed in its position with respect to the reel post D, and operates as a rigid lever arm of that post by which the latter may be rocked fore-and-aft to carry the reel fore-and-aft.

H is an exteriorly notched segment mounted rigidly on the main frame, and conveniently, as illustrated, on the seat plank C', which is rigid with the main frame. A spring-actuated dog $h'$ is mounted on the bracket G, and adapted to engage the notches of the segment H, and for the purpose of actuating the dog to disengage it from the segment, a lever $f^3$ is pivoted on the lever arm F, and connected to the dog $h'$ (such connection being made by a link $f^4$ in the construction illustrated), and a thumb lever $f^5$ at the handle end of the lever F is connected by a link F² to the lever $f^3$, and constitutes familiar means by which the driver can operate the dog. A link F⁴ extends from the lever F to the reel bearing frame E, so that the rocking of said lever about the pivot $g$ raises and lowers the reel frame E, rocking the latter about its pivotal connection at the top of the reel post. One advantage of this construction is that the action of the operator, and the movement which he gives the lever, are the same whether he is adjusting the lever up and down, or, fore and aft, the only difference being that in the one case he presses the thumb lever $f^5$, and in the other case he presses the thumb lever $f^2$. In the one instance, the movement which he gives the lever causes it to swing about the pivot $d$; in the other, the same movement of the hand causes the lever to swing about the pivot $g$. In the first instance, the lever swings with and carries the reel post over its pivot $d$. In the second instance, it swings on the post without moving the latter and rocks the reel frame E.

In order that the swinging of the lever F about the pivot $g$ may not have a tendency to disengage the dog $h'$ from the rack H, the connection of the lever $f^3$, which is mounted upon and therefore must swing within the lever F, is made to coincide substantially with the said pivot $g$ of the latter lever. Exact coincidence is not essential merely because there will always be play in the several joints which would permit a little variation from the theoretically correct position; but approximate coincidence of said pivotal lines is necessary, and in the drawings they are shown very nearly coincident, the theoretically correct position being shown in detail Fig. 2.

The connections from the thumb lever $f^5$ to the dog $h'$ may be varied from that shown in the drawings without necessarily departing from the essential feature of the invention at this point, but whatever change in these devices is made should be such as not to cause the rocking of the lever F over the pivot $g$ to disturb the engagement of the dog $h'$ with the segment H.

The reel is driven by means of a beveled pinion J, meshing with the beveled gear J', the latter being pinned fast to the reel shaft $j$, which extends through the cross arm $E^2$ at the free end of the reel bearing frame E, having a reel spider $E^3$ secured to its grainward end, as the beveled gear J' is secured to its stubbleward end, with the arm $E^2$ between them. Through the trunk of the reel frame E back of the arm $E^2$ is formed an aperture in which the stud $E^4$ is rigidly fixed, the said trunk having bosses $e^4$ $e^4$ extending from both sides to increase the bearing of the stud in the trunk, and the beveled pinion J is provided with a long hub $j^\times$, by which the pinion is journaled on the stud $E^4$, a cotter pin $j'$, inserted through the end of the stud outside the pinion, securing the latter in place. The pinion J is driven by a tumbling shaft K, which is connected by a universal joint at K' to the pinion J, which, for that purpose, has formed upon its grainward face lugs $j^2$ $j^2$, between which there is pivoted the close link $J^3$, whose pivotal apertures $j^3$ and $j^{30}$ extend in planes at right angles to each other, the former being that at which it is pivoted to the lugs of the beveled pinion, and the latter that at which it is pivoted to the tumbling shaft. The latter connection is made by providing the tumbling shaft with a sideward stud or pin $k'$, which may be inserted through the aperture $j^{30}$ and retained by a cotter pin. The tumbling shaft K derives motion from a train of mechanism which it is necessary to trace only from the shaft L, which is the shaft of the driving roller of the elevator as may be understood from its position with respect to the elevator side-board B. At the forward end of this shaft L, in front of the elevator, there is made fast to it the beveled pinion L'.

On the forward side of the elevator frame B, the bracket M is mounted, in which is journaled a shaft which has at the lower end the beveled gear M', which meshes with and is driven by the beveled gear L', and at the upper end the beveled pinion $M^2$, which meshes with and drives beveled gear $M^3$, which obtains bearing upon a stud projecting from the bracket M, at right angles to the bearing of the shaft of the gears M' and $M^2$. The shaft $M^3$ has a long hub $M^{30}$ to give it accuracy of action on the stud, and is retained thereon by the cotter pin through the end of the stud. At the outer end of the hub $M^{30}$ of the wheel $M^3$, it has the lugs $m^{30}$, between which there is pivotally connected a short link $m^3$, and to this short link the tumbling shaft K is connected in the same manner as it is connected to the link $J^3$. This tumbling shaft K is an extensible shaft of the general character commonly called "telescoping," but instead of having one member operating within the other, as in the more common form of telescoping shafts, the two members $k$ $k$ operate side by side, both being square and having their flat surfaces bearing against each other and retained in connection by clasps or lugs $K^2$ $K^2$, which are secured to the ends of the two members $k$ $k$ respectively, and encircle the other member. The peculiarity of this shaft, obtained by the manner of its connection to the short links which constitute the universal joint at its ends, is that the axis of its rotation lies in the plane of the contacting faces of its two members $k$, and not in a line connecting the centers of the two ends, which would be oblique to that plane, and that thereby the sliding friction between the two members in the adjustments which may be made while the shaft is in rotation, is rendered the least possible, because the strain of the action of the shaft does not tend to draw those faces together. It will be understood that the universal joints by which this shaft is connected to its driving and driven gears, respectively, and its extensible character, adapt it to communicate motion to the reel mechanism at whatever position the reel may be set in either of its adjustments.

The same train of gearing which communicates power from the elevator driving shaft to the reel communicates motion also to the butter N. The detail arrangement of this butter is not herein shown, but its general character is familiar. The pinion $M^2$ has a crank arm $M^{20}$, to whose wrist $m^{20}$ the arm N' is pivotally connected. The full relation and construction of this butter are shown in my application, Serial No. 450,110, filed October, 27, 1892, and it is not intended to be claimed or more fully described in this application.

I claim—

1. In a harvester reel, in combination, substantially as set forth, the reel post pivoted at its foot to the harvester frame, and the reel bearing frame pivoted at the head of the reel post; a lever arm connected to the reel post, and a locking segment rigid with the main frame and concentric with the foot pivot of the reel post, and suitable means for locking the reel post to the segment, the connection of said lever with the reel post being pivotal; a link from said lever to said reel bearing frame; a locking segment rigid with the reel post concentric with the said pivotal connection of the lever, and means for locking the lever to said locking segment, whereby the lever may be swung either, about the foot pivot of the reel post to the frame, or, the pivot of the lever to the post, to effect adjustment of the reel either, fore-and-aft, or, up and down.

2. In combination with a reel having fore and aft and vertical adjustments, the reel driving wheel mounted on the reel bearing frame and partaking of said adjustments; and a power-communicating wheel on the main frame which does not partake of said adjustments; the extensible shaft comprising the members $k\,k$, provided with universal joints at the ends of said members respectively to the reel driving wheel and power-communicating wheel, and provided with the loops $K^2\,K^2$, which retain said members together, the axis of said shaft being in the plane of the contacting surfaces of said members thereof: substantially as set forth.

3. In combination with the wheels $M^3$ and J, the universal-joint links $J^3$ and $m^3$; the shaft comprising the members $k\,k$, retained and sliding side by side, and having flat surfaces in contact, the connection of said members to said short links respectively being made by sideward jutting studs from said shaft respectively taking into the links; whereby the plane of the contacting surfaces of the two members $k\,k$ is made to contain the axis of rotation of the shaft: substantially as set forth.

In testimony whereof I have hereunto set my hand, in the presence of two witnesses, at Chicago, Illinois, this 5th day of October, 1892.

ANDREW STARK.

Witnesses:
  CHAS. S. BURTON,
  JEAN ELLIOTT.